(12) United States Patent
Kayran

(10) Patent No.: US 12,109,890 B2
(45) Date of Patent: Oct. 8, 2024

(54) MOTOR VEHICLE, IN PARTICULAR A UTILITY VEHICLE

(71) Applicant: Daimler Truck AG, Leinfelden-Echterdingen (DE)

(72) Inventor: Guenter Kayran, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 18/558,660

(22) PCT Filed: May 2, 2022

(86) PCT No.: PCT/EP2022/061688
§ 371 (c)(1),
(2) Date: Nov. 2, 2023

(87) PCT Pub. No.: WO2022/233776
PCT Pub. Date: Nov. 10, 2022

(65) Prior Publication Data
US 2024/0227532 A1    Jul. 11, 2024

(30) Foreign Application Priority Data
May 3, 2021 (DE) ..................... 10 2021 002 327.7

(51) Int. Cl.
*B60K 6/365* (2007.10)
*B60K 1/00* (2006.01)

(52) U.S. Cl.
CPC ........ *B60K 6/365* (2013.01); *B60K 2001/001* (2013.01); *B60Y 2400/73* (2013.01)

(58) Field of Classification Search
CPC .......... F16H 2200/2007–2017; F16H 3/64–66; B60K 2001/001; B60K 17/16–165
See application file for complete search history.

(56) References Cited

U.S. PATENT DOCUMENTS 1,991,575 A    2/1935  Reese
5,680,908 A *  10/1997 Reed .................... B60K 17/356
                                                    180/65.245

(Continued)

FOREIGN PATENT DOCUMENTS

DE        102013207341 A1 * 10/2013  ............... B60K 6/24
DE    10 2012 220 562 A1    5/2014

(Continued)

OTHER PUBLICATIONS

International Search Report (PCT/ISA/210) issued in PCT Application No. PCT/EP2022/061688 dated Sep. 19, 2022 (3 pages).

(Continued)

*Primary Examiner* — Stacey A Fluhart
*Assistant Examiner* — Lillian T Nguyen
(74) *Attorney, Agent, or Firm* — Crowell & Moring LLP

(57) ABSTRACT

A motor vehicle has a steerable first axle, a driveable second axle, an electric drive for driving the second axle, and a traction battery via which the electric drive can be provided with electrical energy stored in the traction battery. The electric drive has a housing, an electric motor, which has a stator and a rotor that can be rotated around a rotor axis relative to the stator and relative to the housing, and a first planetary gear set arranged coaxially with the rotor axis. The first planetary gear set has a first element, a second element, and a third element.

14 Claims, 4 Drawing Sheets

(56) References Cited

U.S. PATENT DOCUMENTS

| | | | |
|---|---|---|---|
| 2006/0131095 A1 | 6/2006 | Pregel | |
| 2017/0136870 A1* | 5/2017 | Littlefield | ............... B60K 6/365 |
| 2018/0274660 A1* | 9/2018 | Kita | .................... F16H 57/0445 |
| 2019/0344660 A1 | 11/2019 | Kumar et al. | |
| 2020/0262289 A1* | 8/2020 | Pinschmidt | ............ B60K 6/365 |
| 2021/0123512 A1* | 4/2021 | Glückler | ................... F16H 3/66 |

FOREIGN PATENT DOCUMENTS

| | | |
|---|---|---|
| DE | 10 2013 005 719 B3 | 8/2014 |
| DE | 10 2017 111 051 B3 | 6/2018 |
| DE | 10 2017 006 266 A1 | 1/2019 |
| DE | 10 2018 008 939 B3 | 12/2019 |
| DE | 10 2018 130 120 A1 | 5/2020 |

OTHER PUBLICATIONS

German-language Office Action issued in German Application No. 10 2021 002 327.7 dated Jan. 17, 2022 (5 pages).

* cited by examiner

MOTOR VEHICLE, IN PARTICULAR A UTILITY VEHICLE

BACKGROUND AND SUMMARY OF THE INVENTION

The invention relates to a motor vehicle.

An electric drive for a vehicle should be taken as known from DE 10 2012 220 562 A1, having an electric engine as a drive and having a two-speed gearbox as a planetary gearbox, having two switch elements and having a reduction gearbox connected downstream as an output drive. It is further provided that the planetary gearbox is coupled with the drive and the output drive such that the first gear is designed as a direct gear. The object of the present invention is to create a motor vehicle having a particularly advantageous electric drive.

The invention relates to a motor vehicle, which is preferably designed as a motor car. In particular, the motor vehicle can be designed as a utility vehicle and for example has a heavy goods vehicle (HGV). The motor vehicle has a steerable first axle. The feature that the first axle can be steered should in particular be understood to mean the following: for example, the first axle has at least or exactly two first vehicle wheels that are spaced apart from each other in the transverse direction of the vehicle and arranged on opposite sides in the transverse direction of the vehicle, the first vehicle wheels being at least indirectly rotatably connected to a chassis for example designed as a frame and thus being able to be rotated around a wheel axis of rotation relative to the chassis. It is in particular conceivable that a structure such as a driver cab is fixed to the chassis, in particular to the frame. The first vehicle wheels, which are also simply described as wheels, can be pivoted or steered through relative to the frame (chassis) around a steering axis running at least substantially in the vertical direction of the vehicle, whereby lane changes and changes in direction when the motor vehicle is driving around bends can be caused. In particular, the first vehicle wheels are connected with a steering handle arranged in the interior of the motor vehicle and for example designed as a steering wheel, via which the driver can steer the first vehicle wheels in particular by turning the steering handle. In particular, the interior is delimited by the specified driver cab.

The motor vehicle also has a second driveable axle, wherein the axles are also described as vehicle axles. The second axle has at least or exactly two second vehicle wheels, which are also simply described as second wheels. The second vehicle wheels are spaced apart from one another in the transverse direction of the vehicle and arranged on opposite sides in the transverse direction of the vehicle. The second vehicle wheels can be driven, whereby the motor vehicle as a whole can be driven. The second vehicle wheels are also preferably at least indirectly connected to the frame such that they can be rotated around a second wheel axis of rotation. It is preferably provided that the wheel axes of rotation run in parallel with one another and in the transverse direction of the vehicle, in particular when the motor vehicle is driving straight ahead. The vehicle wheels are ground contact elements of the motor vehicle, which can be or is supported downwards in the vertical direction of the vehicle on the ground via the ground contact elements. If the second vehicle wheels, and thus the motor vehicle are driven, while the motor vehicle is supported downwards in the vertical direction of the vehicle on the ground via the ground contact elements, then the motor vehicle is driven along the ground, and the vehicle wheels roll on the ground.

The motor vehicle has an electric drive for driving the second axle. In other words, the second axle can be driven electrically, in particular purely electrically, by means of the electric drive. For this purpose, it should in particular be understood that the second vehicle wheels of the second axle can be driven electrically, in particular purely electrically, by means of the electric drive, whereby the motor vehicle can be driven electrically, in particular purely electrically. The motor vehicle is thus preferably designed as a hybrid vehicle or as an electric vehicle. It is in particular conceivable that, with regard to the first axle and the second axle, only the second axle can be driven by means of the electric drive. This should in particular be understood to mean that, with regard to the first vehicle wheels and the second vehicle wheels, only the second vehicle wheels of the second axle can be driven by means of the electric drive.

The motor vehicle also has a traction battery. The traction battery is an electrical energy store, in or by means or which electrical energy is or is to be stored. By means of the traction battery, the electric drive can be provided with the electrical energy stored in the traction battery, whereby the motor vehicle can be driven electrically, in particular purely electrically.

The electric drive has a housing and an electric motor that has a stator and a rotor. The electric motor is also described as a first electric motor, such that the stator is also described as a first stator and the rotor is also described as a first rotor. The first rotor can be rotated relative to the stator and relative to the housing around a rotor axis, which is also described as a first rotor axis. In particular, the rotor can be driven by means of the stator. For example, the stator and the rotor are respectively at least partially arranged in the housing. It can further be provided that the electric motor can provide via its rotor torque to electrically, in particular purely electrically, drive the second axle, and thus the motor vehicle. To drive the rotor, and thus to drive the second axle by means of the electric motor, the electric motor is provided with the electrical energy stored in the traction battery.

The electric drive additionally has a first planetary gear set, arranged coaxially with the rotor axis, the first planetary gear set having a first element, a second element and a third element. One of the elements of the first planetary gear set is a first sun gear that is also simply described as a first sun. One of the elements of the first planetary gear set is a first planetary carrier that is also simply described as a first stage. One of the elements of the first planetary gear set is a first annular gear of the first planetary gear set. At least one of the elements of the first planetary gear set can in particular be rotated around a first gear set axis of rotation relative to the housing, in particular if the at least one element of the first planetary gear set is not connected to the housing in a manner fixed against rotation, wherein the first gear set axis of rotation is also described as a main axis of rotation, is designed as a main axis of rotation or coincides with a main axis of rotation. In the context of the present disclosure, rotatable components arranged coaxially with one another should be understood as components or component elements that can in particular be rotated relative to the housing around a respective component element axis of rotation such as the first gear set axis of rotation, wherein the component element axes of rotation run coaxially with one another or coincide. The feature that the first planetary gear set is arranged or runs coaxially with the rotor axis should thus be understood to mean that the first gear set axis of rotation and thus the main axis of rotation coincides with the rotor axis. The rotor axis is also described as a first rotor axis of rotation.

The feature that the first planetary gear set is arranged coaxially with the rotor axis should further preferably be understood to mean that the elements of the first planetary gear set arranged coaxially with one another are arranged coaxially with the rotor and thus coaxially with the electric motor.

The electric drive additionally has a second planetary gear set, which is arranged coaxially with the rotor axis and thus also coaxially with the first planetary gear set. The second planetary gear set has a fourth element, a fifth element and a sixth element. One of the elements of the second planetary gear set is a second sun gear that is also simply described as a second sun. One of the elements of the second planetary gear set is a second planetary carrier that is also simply described as a second stage. One of the elements of the second planetary gear set is a second annular gear. At least one of the elements of the second planetary gear set can be rotated around a second gear set axis of rotation relative to the housing, at least if the at least one element of the second planetary gear set is not connected to the housing in a manner fixed against rotation. As the planetary gear sets are arranged coaxially with one another, the gear set axes of rotation coincide, and the gear set axes of rotation coincide with the main axis of rotation or the second gear set axis of rotation is the main axis of rotation, and the first rotor axis also coincides with the second gear set axis of rotation. The elements of the second gear set are additionally arranged coaxially with one another.

The electric motor is also described as a first electric motor. When the electric motor, the stator, the rotor and the rotor axis are mentioned in the following, unless otherwise specified, this should be understood to mean the first electric motor, the first rotor, the first stator and the first rotor axis.

In the motor vehicle, the first electric motor, the first planetary gear set and the second planetary gear set are arranged one after the other, following one another in the following order when viewed in the axial direction of the rotor, i.e., along the first rotor axis: the electric motor—the first planetary gear set—the second planetary gear set. In other words, the first planetary gear set is arranged after the electric motor and the second planetary gear set is arranged after the first planetary gear set in the axial direction of the rotor. In other words again, the first planetary gear set follows the rotor and the second planetary gear set follows the first planetary gear set in the axial direction of the rotor, i.e., when viewed along the first rotor axis, respectively at least partially, in particular at least substantially and thus at least more than half or preferably completely. As the rotor axis of rotation coincides with the main axis of rotation, the axial direction of the rotor and thus of the electric motor corresponds with the axial direction of the respective planetary gear set.

So a particularly advantageous and in particular compact structure of the electric drive can be obtained and a complexity of the electric drive can advantageously be kept low, it is provided according to the invention that the first axle, the traction battery, the second axle and the electric drive are arranged one after the other or following one another in the following order when viewed in the longitudinal direction of the vehicle, i.e., in the longitudinal direction of the motor vehicle: the first axle—the traction battery—the second axle—the electric drive. The longitudinal direction of the vehicle of the motor vehicle coincides with its forward direction of travel if the motor vehicle is driven straight ahead, and thus is not driving around a bend. It is in particular provided that the longitudinal direction of the vehicle runs perpendicular to the previously specified transverse direction of the vehicle, such that the respective wheel axis of rotation in particular runs perpendicular to the longitudinal direction of the vehicle when the motor vehicle is driving straight ahead.

It is further provided according to the invention that the housing is at least substantially rigidly attached to the frame of the motor vehicle. This should be understood to mean that the housing is attached to the frame, i.e., is fixed to the frame, while bypassing the or all of the vehicle axles of the motor vehicle. In other words again, the housing is not axially fixed, i.e., is not fixed to the frame with the interposition of one of the axles, and instead the housing is fixed to the frame. The respective vehicle wheel of the respective axle can thus carry out inward and outward spring movements relative to the frame, in particular implemented in the vertical direction of the vehicle, without the housing moving relative to the frame with the respective axle or with the respective vehicle wheel. The respective vehicle wheel thus also carries out the inwards and outwards spring movements relative to the housing. In particular, the housing is at least substantially directly attached to the frame. It is conceivable that the housing is fixed to the frame elastically, and thus in a vibration-damped manner, i.e., via at least one mounting element for example formed from rubber that can be elastically deformed, but the housing is not fixed to the frame via one of the axles, such that for example a force path, via which forces can be transmitted between the housing and the frame, runs from the housing to the frame or vice versa and does not run over a vehicle axle of the motor vehicle.

According to the invention, it is further provided that the electric drive has an angle drive that can in particular be driven by the rotor, such that the second vehicle wheels of the driveable or driven second axle can be driven by the rotor, and thus by the electric motor, via the angle drive. The angle drive should in particular be understood to mean that a torque deflection for example of at least 70 degrees, in particular at least 80 degrees and most particularly 90 degrees can be caused by means of the angle drive, this should in particular be understood to mean the following: Via the rotor, the electric motor can provide torques for driving the second vehicle wheels, wherein the respective torque provided by the electric motor via the rotor and provided to drive the second axle or the second vehicle wheels is also described as a drive moment or drive torque. The respective drive moment can be or is transmitted from the rotor to the second axle, and thus to the respective second vehicle wheel of the second axle, via a torque transmission path. The angle drive is arranged in the torque transmission path running from the rotor to or onto the second axle. By means of the angle drive, the respective drive moment running along the torque transmission path is deflected, specifically, as previously described, preferably by at least 70 degrees, in particular at least 80 degrees and most particularly at least or exactly 90 degrees. This should in particular be understood to mean that a first partial region of the torque transmission path and a second partial region of the torque transmission path run transversely, in particular perpendicularly, with one another and form an angle that is preferably at least 70 degrees, in particular at least 80 degrees and most preferably at least or exactly 90 degrees, wherein in particular the angle is the smallest angle formed by the partial regions. The partial regions can be or are coupled with one another via the angle drive, in particular permanently, in a torque-transmitting manner, such that for example an input of the angle drive is arranged in the first partial region and an output of the angle drive is arranged in the second partial region, in particular such that the input and the output can be or are coupled with each other in a torque-transmitting manner, in particular permanently. For example, the respective drive moment can be introduced into the angle drive via the input of the angle drive, whereby the angle drive can be driven by the rotor. Via its output, the angle drive can provide the torque introduced into the angle drive or a further torque resulting from the torque introduced into the angle drive and transmit the torque to the second axle. The angle drive makes it possible to implement a particularly short length of the electric drive in the axial direction of the rotor, and thus of the electric drive as a whole.

A cardan shaft which is for example arranged in the second partial region of the torque transmission path is further provided according to the invention. It is thus preferably provided that the cardan shaft can be driven by the rotor, and thus by the electric motor, via the angle drive, such that the second axle can be driven by the angle drive, in particular by the output of the angle drive, via the cardan shaft. One of the elements of the second planetary gear set is or can be coupled with an input gearwheel of the angle drive in a manner fixed against rotation. The input gearwheel is also described as an input gear and is arranged on or in the input of the angle drive. In other words, the input gearwheel is a component of the input of the angle drive, such that for example the respective drive moment can be introduced into the angle drive via the input gearwheel. The input gearwheel is thus in particular arranged in the first partial region. An output gearwheel of the angle drive, of which the output gearwheel is also described as an output gear, is or can be coupled with an input side of the cardan shaft, in particular in a torque-transmitting manner. The output gearwheel is thus arranged in or on the output of the angle drive. In other words, the output gearwheel of the angle drive is a component of the output of the angle drive, such that the angle drive can provide the drive moment or the respective torque resulting from the drive moment via the output gearwheel, and the respective drive moment can be introduced into the angle drive via the input gearwheel. The output gearwheel is thus for example arranged in the second partial region. The input side of the cardan shaft is preferably arranged in the second partial region, such that the drive moment or further torque provided by the angle drive can be transmitted to the cardan shaft via the input side of the cardan shaft, and can thus be introduced into the cardan shaft. For example, it is provided that the output gearwheel interlocks with the input gearwheel, in particular directly. The output gearwheel can be driven by the input gearwheel, such that the cardan shaft can be driven by the output gearwheel via its input side. The cardan shaft can thus be driven by the input gearwheel via the output gearwheel.

An output side of the cardan shaft is or can be coupled with an axle gearbox of the second axle. The output side of the cardan shaft is preferably arranged in the second partial region of the torque transmission path, wherein the output side can be driven by the input side. The output side can thus be driven by the output gearwheel via the input side, and the axle gearbox can be driven by the input side via the output side, such that the axle gearbox can be driven by the output gearwheel via the cardan shaft, and can thus be driven via the angle drive. The axle gearbox is preferably a differential gearbox also simply described as a differential, via which the second vehicle wheels can be driven by the cardan shaft, in particular by the output side, in particular even while driving around a bend. As is already sufficiently known from the general prior art, the axle gearbox is preferably designed to permit different rotational speeds of the second vehicle wheels of the second axle when the motor vehicle is driving around a bend, in particular while the second vehicle wheels are coupled with the cardan shaft via the axle gearbox in a torque-transmitting manner and are in particular driven by the cardan shaft via the axle gearbox to drive the motor vehicle.

In the context of the present disclosure, the feature that two component elements are connected to one another in a manner fixed against rotation should be understood to mean that the component elements are arranged coaxially with each other and are connected to each other such that they rotate together at the same angular velocity, in particular around a component axis of rotation shared by the component elements, in particular relative to the previously specified housing. The feature that the two component elements are permanently connected to each other in a manner fixed against rotation should be understood to mean that no switching element is provided, which can be switched between a coupled state connecting the component elements with each other in a manner fixed against rotation and a decoupled state releasing the component elements for a rotation relative to one another implemented in particular around the component axis of rotation, and instead the component elements can be continuously or permanently (always) connected to each other in a manner fixed against rotation. The feature that the or two component elements can be connected to each other in a manner fixed against rotation should in particular be understood to mean that a switching element is assigned to the component elements, the switching element being able to be switched between at least one coupled state and at least one decoupled state. In the coupled state, the component elements are connected to each other in a manner fixed against rotation by means of the switching element. In the decoupled state, the component elements are decoupled from each other, such that in the decoupled state, the component elements can be rotated relative to each other, in particular around the component axis of rotation.

The feature that two component elements are connected to each other in a torque-transmitting manner should be understood to mean that a torque can be transmitted between the component elements, i.e., that a torque can be transmitted from one component element to the other component element, such that for example one component element can drive the other component element. If the or two component elements are coupled or connected with each other in a torque-transmitting manner, the component elements do not necessarily have to be arranged coaxially with each other. Components that are connected to each other in a manner fixed against rotation are also coupled with one another in a torque-transmitting manner, wherein the reverse does not necessarily apply. The feature that two component elements are permanently connected or coupled with each other in a torque-transmitting manner should be understood to mean that no switching element is provided that can be switched between a coupled state connecting or coupling the component elements with each other in a torque-transmitting manner and a decoupled state, in which no torques can be transmitted between the component elements via the coupling element, and instead the component elements are continuously or permanently connected or coupled with each other in a torque-transmitting manner. Thus, the feature that the or two component elements can be connected or coupled with each other in a torque-transmitting manner should in particular be understood to mean that a switching element is assigned to the component elements, the switching element being able to be switched between at least one coupled state and at least one decoupled state. In the coupled state, the component elements are connected to each other in a torque-transmitting manner by means of the switching element, such that torques can be transmitted between the component elements via the switching element. One of the component elements can thus drive the other component element via the switching element. In the decoupled state, the component elements are decoupled from each other, such that in the decoupled state, no torques can be transmitted between the component elements.

In this regard and with regard to the angle drive, it can thus be provided, for example, that the output gearwheel and the input gearwheel can be coupled with each other in a manner fixed against rotation. In particular, it is conceivable that the input gearwheel and the output gearwheel are coupled with each other in a torque-transmitting manner, in particular permanently, in particular such that the input gearwheel interlocks, in particular directly, with the output gearwheel. However, as the angle drive causes the previously described torque deflection, in particular such that for example the input gearwheel is arranged in the first partial region and the output gearwheel is arranged in the second partial region, which runs transversely or perpendicularly to the first partial region, the output gearwheel and the input gearwheel are not arranged coaxially with one another. For example, the input gearwheel can be rotated around an input gearwheel axis of rotation relative to the housing, and the output gearwheel can be rotated around an output gearwheel axis of rotation relative to the housing, wherein the output gearwheel axis of rotation runs transversely or perpendicularly to the input gearwheel axis of rotation, in particular while the input gearwheel and the output gearwheel are coupled with each other in a torque-transmitting manner, in particular permanently, in particular interlock directly with each other. It is conceivable that the input gearwheel axis of rotation runs in the first partial region or coincides with the first partial region of the torque transmission path, wherein for example the output gearwheel axis of rotation runs in the second partial region or coincides with the second partial region. Using the angle drive, the electric drive can be installed transversely, i.e., constructed transversely, such that the axial direction of the rotor, i.e., the first rotor axis or the main axis of rotation runs transversely or preferably perpendicularly to the longitudinal direction of the vehicle. It is in particular conceivable that the first partial region coincides with the main axis of rotation, and thus runs transversely or perpendicularly to the transverse direction of the vehicle, wherein it is in particular conceivable that the second partial region runs in the longitudinal direction of the vehicle, and thus coincides with the longitudinal direction of the vehicle. The respective drive moment can thus be particularly advantageously transmitted to the second axle via the angle drive and the cardan shaft, and the electric drive can be installed transversely, in particular behind the second axle in the longitudinal direction of the vehicle. In addition, as the housing, and thus the electric drive are not fixed to the axle but instead fixed to the frame, the housing or the electric drive is not a non-spring-loaded mass, but a spring-loaded mass, such that excessive wear can be avoided. A further advantage of the arrangement of the electric drive behind the second axle in the longitudinal direction of the vehicle is that the traction battery can be arranged between the first axle and the second axle in the longitudinal direction of the vehicle. An advantageous size and a particularly high storage capacity of the traction battery can thus be produced.

For example, the input gearwheel of the angle drive is a disc gear, wherein the output gearwheel of the angle drive can be a bevel gear. As an alternative or in addition, it is conceivable that an in particular second bevel gear is or can be connected to the cardan shaft, in particular to the output side of the cardan shaft, in a torque-transmitting manner, in particular in a manner fixed against rotation. It is further conceivable that the axle gearbox has an in particular second disc gear, which is connected or coupled with the second bevel gear in a torque-transmitting manner, in particular such that the second bevel gear interlocks with the second disc gear, in particular directly. A particularly advantageous, compact and low-wear torque transmission can thus be produced.

By switching the two planetary gear sets, the length of the electric drive as a whole running in the axial direction of the rotor and thus of the electric drive can be kept particularly short, such that a particularly compact structure of the electric drive can be produced. The electric drive can thus be particularly advantageously constructed or installed transversely. In addition, the electric drive can thus be arranged behind the second axle, wherein more installation space for remaining components can be created between the axles in comparison with an arrangement of the electric drive between the axles in the longitudinal direction of the vehicle. In addition, at least the following advantages can be obtained:

modular structure of the electric drive, whereby different vehicle types, tonnages and/or axles can be electrified, in particular such that the motor vehicle can be designed as a purely electric vehicle or as a hybrid vehicle, saving installation space due to transverse construction of the electric drive and use of the electric drive as a rear motor, the complexity of the electric drive being kept particularly low, greater variability at low cost in development, production and maintenance or repair.

In an advantageous embodiment of the invention, the output gearwheel of the angle drive is coupled, i.e., connected, with a first gearwheel of a spur gear stage in a manner fixed against rotation, in particular permanently. A particularly efficient operation can thus be obtained, and a particularly compact structure of the electric drive can be produced. A particularly significant advantage of this embodiment is that a particularly advantageous total transmission of the electric drive can be produced. In addition, the driveable second axle also described as a main drive axle can be positioned particularly well, in particular relative to the components arranged or to be arranged coaxially with the main axis of rotation. In particular, an advantageous positionability of the main axis of rotation in its state in which it is installed in the motor vehicle can be obtained, in particular such that the main axis of rotation can be arranged as high as possible in the vertical direction of the vehicle and as centrally as possible in the transverse direction of the vehicle between the sides that are opposite each other in the transverse direction of the vehicle.

It has proved particularly advantageous if a second gearwheel of the spur gear stage is coupled, i.e., connected, with the input side of the cardan shaft in a manner fixed against rotation, in particular permanently. It is in particular provided that the first gearwheel interlocks, in particular directly, with the second gearwheel. A particularly compact structure and a particularly efficient operation can thus be produced.

A further embodiment is characterized in that the electric drive has a first switch element, by means of which the third element can be coupled, i.e., connected, with the rotor in a manner fixed against rotation. The first switch element can thus be switched between at least one first coupled state and at least one first decoupled state. For example, the first switch element can be moved, in particular translationally and/or relative to the housing and/or in the axial direction of the rotor, i.e., along the rotor axis or along a movement direction running in parallel with the rotor axis, between at least one first coupled position and at least one first decoupled position. The first coupled position causes the first coupled state and the first decoupled position causes the first decoupled state. In the first coupled state, i.e., in the first coupled position, the third element is coupled, i.e., connected, with the rotor in a manner fixed against rotation by means of the first switch element. In the first decoupled state, i.e., in the first decoupled position, however, the first switch element releases the third element for a rotation around the main axis of rotation implemented relative to the rotor.

A second switch element is further provided, by means of which the third element can be coupled, i.e., can be connected, with the housing in a manner fixed against rotation. The second switch element can thus be switched between at least one second coupled state and at least one second decoupled state. In particular, the second switch element can be moved, in particular translationally and/or relative to the housing and/or in the axial direction of the rotor, i.e., along the rotor axis or along the previously described movement direction, between at least one second coupled position and at least one second decoupled position. The second coupled position causes the second coupled state, and the second decoupled position causes the second decoupled state. In the second coupled state, the third element is coupled, i.e., connected, with the housing in a manner fixed against rotation by means of the second switch element. In the second decoupled state, however, the second switch element releases the third element for a rotation around the main axis of rotation implemented relative to the housing.

A third switch element is further preferably provided, by means of which the first element can be coupled, i.e., can be connected, with the rotor in a manner fixed against rotation. The third switch element can for example be switched between at least one third coupled state and at least one third decoupled state. In particular, for example, the third switch element can be moved, in particular translationally and/or relative to the housing and/or in the axial direction of the rotor, and thus along the axis of rotation, between at least one third coupled position causing the third coupled state and at least one third decoupled position causing the third decoupled state. In the third coupled state, the first element is coupled with the rotor in a manner fixed against rotation by means of the third switch element. In the third decoupled state, however, the third switch element releases the first element for a rotation around the main axis of rotation implemented relative to the rotor.

In addition, a fourth switch element is further preferably provided, by means of which the first element can be coupled with the housing in a manner fixed against rotation. For example, the fourth switch element can be switched between a fourth coupled state and a fourth decoupled state. In particular, the fourth switch element can be moved, e.g., translationally and/or relative to the housing and/or in the axial direction of the rotor, between at least one fourth coupled position causing the fourth coupled state and at least one fourth decoupled position causing the fourth decoupled state. In the fourth coupled state, the first element is coupled with the housing in a manner fixed against rotation by means of the fourth switch element. In the fourth decoupled state, however, the fourth switch element releases the first element for a rotation around the main axis of rotation implemented relative to the housing. The fourth switch element is arranged on a side of the electric motor facing away from the first planetary gear set in the axial direction of the rotor.

A fifth switch element is further preferably provided, by means of which the second element can be coupled, i.e., can be connected, with the fourth element in a manner fixed against rotation. For example, the fifth switch element can thus be switched between a fifth coupled state and a fifth decoupled state. For example, the fifth switch element can be moved, in particular relative to the housing and/or translationally and/or in the axial direction of the rotor, between at least one fifth coupled position causing the fifth coupled state and at least one fifth decoupled position causing the fifth decoupled state. In the fifth coupled state, the second element is coupled, i.e., connected, with the fourth element in a manner fixed against rotation by means of the fifth switch element. In the fifth decoupled state, however, the fifth switch element releases the second element for a rotation around the main axis of rotation implemented relative to the fourth element.

The fifth element is or can be coupled with the input gearwheel of the angle drive in a manner fixed against rotation. By using the switch elements, a particularly advantageous driveability, and thus a particularly efficient operation can be implemented in a particularly installation space-saving manner. In particular, several, in particular switchable, gears of the electric drive can be obtained in a particularly installation space-saving manner, wherein the gears for example differ from one another in their respective transmission ratios.

In a further particularly advantageous embodiment of the invention, the fifth switch element is designed to couple the second element with the fourth element in a manner fixed against rotation and with the sixth element in a manner fixed against rotation. For example, the fifth switch element can be switched in a sixth coupled state. For example, the fifth switch element can also be moved, in particular relative to the housing and/or translationally and/or in the axial direction of the rotor, into at least one sixth coupled position causing the sixth coupled state. In the sixth coupled state, the second element is coupled with the sixth element in a manner fixed against rotation by means of the fifth switch element. It is conceivable that, in the sixth coupled state, the fifth switch element releases the fourth element for a rotation in particular around the main axis of rotation implemented relative to the second element and/or relative to the sixth element. It is further conceivable that, in the fifth coupled state, the fifth switch element releases the sixth element for a rotation in particular around the main axis of rotation implemented relative to the second element and relative to the fourth element. In addition, it is for example conceivable that, in the fifth decoupled state, the fifth switch element releases the second element for a rotation in particular around the main axis of rotation implemented relative to the fourth element and relative to the sixth element. It is further conceivable that the fifth decoupled state corresponds to the sixth coupled state. Furthermore, for example, the fifth switch element can be switched into a seventh coupled state. For example, the fifth switch element can be moved, in particular relative to the housing and/or translationally and/ or in the axial direction of the rotor, into at least one seventh coupled position causing the seventh coupled state. In the seventh coupled state, both the fourth element and the sixth element are simultaneously coupled with the second element in a manner fixed against rotation, for example by means of the fifth switch element. A particularly advantageous driveability can thus be obtained in a particularly installation-space saving manner.

As an alternative to this, the use of a further switching element provided in addition to the first, second, third, fourth and fifth switch element would be conceivable, wherein for example the second element can be coupled with the fourth element in a manner fixed against rotation by means of the fifth switch element, and wherein the second element can be coupled or connected with the sixth element in a manner fixed against rotation by means of the switching element.

A further embodiment is characterized by a sixth switch element, by means of which the sixth element can be coupled with the housing in a manner fixed against rotation. For example, the sixth switch element can thus be switched between at least one eighth coupled state and at least one seventh decoupled state. For example, the sixth switch element can be moved, in particular translationally and/or relative to the housing and/or in the axial direction of the rotor, between at least one eighth coupled position causing the eighth coupled state and at least one seventh decoupled position causing the seventh decoupled state. In the eighth coupled state, the sixth element is coupled with the housing in a manner fixed against rotation, and thus fixed to the housing in a manner fixed against rotation, by means of the sixth switch element. In the seventh decoupled state, however, the sixth switch element releases the sixth element for a rotation in particular around the main axis of rotation implemented relative to the housing. A particularly efficient operation can thus be produced in a particularly installation space-saving manner.

So the number of parts, the cost, the weight and the required installation space can be kept particularly low, it is provided in a further embodiment of the invention that the third switch element and the fourth switch element are arranged axially, i.e., in the axial direction of the rotor, next to each other and are combined to form a coupler switch element having at least two switch positions. In particular, it is conceivable that the third switch element and the fourth switch element are designed as one part with each other. Thus, for example, the third coupled position corresponds to the fourth decoupled position or the third coupled state corresponds to the fourth decoupled state, and the fourth decoupled position preferably corresponds to the fourth coupled position or the third decoupled state corresponds to the fourth coupled state. Thus, for example, a first of the switch positions is the third coupled position or the fourth decoupled position, and a second of the switch positions is for example the fourth coupled position or the third decoupled position.

In a further, particularly advantageous embodiment of the invention, a seventh switch element, by means of which the fourth element can be coupled with the housing in a manner fixed against rotation. For example, the seventh switch element can thus be switched between a tenth coupled state and an eighth decoupled state. For example, the seventh switch element can be moved, in particular translationally and/or relative to the housing and/or in the axial direction of the rotor, between at least one tenth coupled position causing the tenth coupled state and at least one eighth decoupled position causing the eighth decoupled state. In the tenth coupled state, the fourth element is coupled with the housing in a manner fixed against rotation, i.e., fixed to the housing in a manner fixed against rotation, by means of the seventh switch element. In the eighth decoupled state, however, the seventh switch element releases the fourth element for a rotation in particular around the main axis of rotation implemented relative to the housing. A particularly advantageous driveability can thus be obtained in a particularly installation-space saving manner.

In the context of the present disclosure, the ordinal numbers also described as ordinals used in the present description, such as "first", "second", "third", "fourth", "fifth", sixth", "seventh", element etc., should not, unless otherwise specified, be understood as ordinal numbers per se, which specify a sequence or a number, and instead the ordinal numbers used in the description should be seen, unless otherwise specified, far more as adjectives for differentiating the terms assigned to the respective ordinal numbers, such as "switch element", "coupled state", "decoupled state", "coupled position", decoupled position", element etc. from one another, and thus for being able to keep them as separate terms, and thus for being able to refer unambiguously to these terms assigned to the ordinal numbers.

A further embodiment is characterized in that the fourth switch element, the electric motor, the first planetary gear set, the second planetary gear set, the input gearwheel and the seventh switch element are arranged one after the other or following one another in the following order when viewed in the direction of the driveable second axle (main drive axle), and in particular along the axial direction of the rotor: The fourth switch element—the electric motor—the first planetary gear set—the second planetary gear set—the input gearwheel—the seventh switch element. A particularly installation-space saving structure of the electric drive can thus be produced.

In a further, particularly advantageous embodiment of the invention, the motor vehicle comprises a second electric motor which is arranged coaxially with the electric motor and which has a second stator and a second rotor that can be rotated relative to the second stator. In particular, the second rotor can be rotated around a second rotor axis, that is also described as a second rotor axis of rotation, relative to the stator. As the electric motors are arranged coaxially with each other, the rotors are arranged coaxially with each other, such that the rotor axes coincide. The second rotor axis thus coincides with the main axis of rotation, such that the second electric motor or the second rotor is also arranged coaxially with the planetary gear sets. The second rotor is or can be coupled with one of the elements of the second planetary gear set in a manner fixed against rotation. A particularly advantageous drive can thus be provided in an installation space-saving manner.

It has proved particularly advantageous if the second rotor is or can be coupled with the fourth element in a manner fixed against rotation, whereby a particularly good driveability can be achieved in a particularly advantageous, installation space-saving manner.

In a further, particularly advantageous embodiment of the invention, the first electric motor, the first planetary gear set, the second planetary gear set, the input gearwheel and the second electric motor are arranged one after the other in the following order when viewed in the direction of the driveable second axle and thus for example when viewed along the axial direction of the rotor: the first electric motor—the first planetary gear set—the second planetary gear set—the input gearwheel—the second electric motor. A particularly installation-space saving structure can thus be produced.

In a further, particularly advantageous embodiment of the invention, the motor vehicle comprises a further electric motor having a further stator and a further rotor that is arranged coaxially with the first rotor and the planetary gear sets. The further electric motor is thus arranged coaxially with the first electric motor. For example, the further rotor can be rotated around a further rotor axis relative to the further stator. As the further electric motor is arranged coaxially with the first electric motor and coaxially with the planetary gear sets, the further rotor axis coincides with the first rotor axis and with the main axis of rotation. A third planetary gear set is provided that has a seventh element, an eighth element and a ninth element. One of the elements of the third planetary gear set is a third sun gear that is also simply described as a third sun. One of the elements of the third planetary gear set is a third planetary carrier that is also simply described as a third stage. One of the elements of the third planetary gear set is a third annular gear.

In this embodiment, a fourth planetary gear set is further provided, which has a tenth element, an eleventh element and a twelfth element. One of the elements of the fourth planetary gear set is a fourth sun gear that is also simply described as a fourth sun. One of the elements of the fourth planetary gear set is a fourth planetary carrier that is also simply described as a fourth stage. One of the elements of the fourth planetary gear set is a fourth annular gear. For example, the respective planetary gear set has at least one or several planetary gears, wherein the respective planetary gear is rotatably fixed to the respective stage of the respective planetary gear set. It is in particular provided that the respective planetary gear of the respective planetary gear set interlocks, in particular directly, with the respective sun of the respective planetary gear set on one side and, in particular directly, with the respective annular gear of the respective planetary gear set on the other side.

It is preferably provided that the second rotor is or can be coupled with the seventh element in a manner fixed against rotation, wherein the eighth element is or can be coupled with the tenth element, in particular in a torque-transmitting manner or in a manner fixed against rotation, and wherein the eleventh element is or can be coupled with the input gearwheel of the angle drive in a manner fixed against rotation. A particularly high power of the electric drive can thus be provided in a particularly installation space-saving manner, such that the electric drive can be particularly advantageously used for heavy-weight motor vehicles, and can also drive such heavy-weight motor vehicles effectively and efficiently, in particular purely electrically.

Finally, it has proved particularly advantageous if the first electric motor, the first planetary gear set, the second planetary gear set, the input gearwheel of the angle drive, the fourth planetary gear set, the third planetary gear set and the further electric motor are arranged one after the other in the following order when viewed in the direction of the driveable second axle or in particular when viewed in the axial direction of the rotor: the first electric motor—the first planetary gear set—the second planetary gear set—the input gearwheel of the angle drive—the fourth planetary gear set—the third planetary gear set—the further electric motor. A particularly installation-space saving structure of the electric drive can thus be produced.

Further advantages, features and details of the invention result from the following description of preferred exemplary embodiments and with reference to the drawings. The features and combinations of features specified previously in the description and the features and combinations of features specified in the following description of figures and/or shown in the figures alone can be used not only in the respectively specified combinations, but also in other combinations or in isolation without leaving the scope of the invention.

DETAILED DESCRIPTION OF THE DRAWINGS

Figure 1:
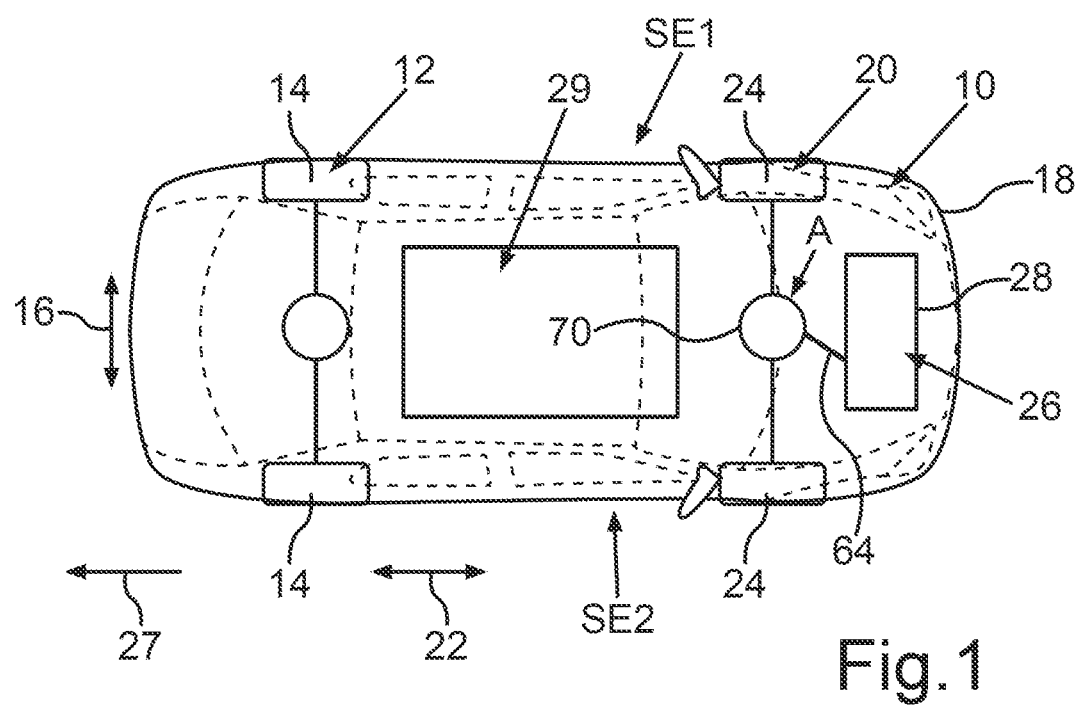
FIG. 1 shows a schematic aerial view of a motor vehicle having an electric drive.

Identical or functionally identical elements are provided with the same reference numerals in the Figures.

FIG. 1 shows a motor vehicle 10 that is preferably designed as a motor car in a schematic aerial view. Most preferably, the motor vehicle 10 is designed as a utility vehicle, in particular as a heavy goods vehicle (HGV). The motor vehicle 10 has a first axle 12 that is described as a first vehicle axle. The first axle 12 is a steerable axle. This means that the first axle 12 has at least or exactly two first vehicle wheels 14 that are also described as first wheels. It can be seen from FIG. 1 that the vehicle wheels 14 are spaced apart from each other in the transverse direction of the vehicle and are arranged on opposite sides SE1 and SE2 of the motor vehicle 10 in the transverse direction of the vehicle. The transverse direction of the vehicle is depicted by a double arrow 16 in FIG. 1. The vehicle wheels 14 can be pivoted and thus steered, in particular together, around a respective hinge axis relative to a structure of the motor vehicle 10 not depicted in FIG. 1, whereby lane changes, changes of direction and cornering of the motor vehicle 10 can be caused. In FIG. 1, the vehicle wheels 14 are in their straight alignment, by means of which a journey of the motor vehicle 10 straight ahead can be caused. The motor vehicle 10 can thus be driven along a straight line in the straight alignment of the vehicle wheels 14. The motor vehicle 10 additionally comprises a frame 18 that is also described as a chassis. For example, the frame 18 is designed as a ladder frame. The previously specified structure is preferably designed separately from the frame 18 and fixed to the frame 18. For example, the structure is a driver cab that delimits an interior of the motor vehicle 10. The driver of the motor vehicle 10 can be located in the interior, and thus in the structure, in particular during a journey of the motor vehicle 10.

The motor vehicle 10 additionally comprises at least or exactly one second axle 20 that is also described as a second vehicle axle. It can be seen from FIG. 1 that the axles 12 and 20 are arranged one after the other or following one another in the longitudinal direction of the vehicle, wherein the longitudinal direction of the vehicle is depicted in FIG. 1 by a double arrow 22 and is perpendicular to the transverse direction of the vehicle. The second axle 20 has at least or exactly two second vehicle wheels 24, which are also described as second wheels. The vehicle wheels 24 are arranged spaced apart from one another in the transverse direction of the vehicle and arranged on the respective opposite sides SE1 and SE2 in the transverse direction of the vehicle. In FIG. 1, a forward direction of travel of the motor vehicle 10 is shown by an arrow 27, the vehicle being driven along its forward direction of travel or forwards in its forward direction of travel. In relation to the forward direction of travel, which runs in parallel with the longitudinal direction of the vehicle or coincides with the longitudinal direction of the vehicle, the side SE1 is the right side of the motor vehicle 10, such that the side SE2 is the left side of the motor vehicle 10. The axle 20 is arranged in the axle 12 in the longitudinal direction of the vehicle in relation to the forward direction of travel. The axle 20 is a driven, i.e., driveable axle. This should in particular be understood to mean the following: The motor vehicle 10 has an electric drive 26, by means of which the axle 20, i.e., the vehicle wheels 24, can be driven electrically, in particular purely electrically. The motor vehicle as a whole can thus be driven electrically, in particular purely electrically, by means of the electric drive 26, wherein the motor vehicle 10 can for example be designed as a pure electric vehicle or as a hybrid vehicle.

The motor vehicle 10 has a traction battery 29, which is for example arranged between the axles 12 and 20 in the longitudinal direction of the vehicle. The traction battery 29 is an electrical energy store in which electrical energy is to be or is stored. Preferably, the traction battery 29 is a high-voltage component, of which the electrical voltage, in particular the electrical operating or nominal voltage, is preferably greater than 50 volts, in particular greater than 60 volts, and most preferably several 100 volts. As is explained in more detail in the following, the electric drive 26 can be provided with the electrical energy stored in the traction battery 29, for example in order thus to electrically, in particular purely electrically, drive the vehicle wheels 24. In particular, the electrical energy in the traction battery 29 is to be or is stored electrochemically.

It can be seen particularly clearly from FIG. 1 that the electric drive 26 is arranged behind the axle 20 arranged behind the axle 12 in the longitudinal direction of the vehicle in the longitudinal direction of the vehicle and in particular in relation to the forward direction of travel. A particularly large amount of space can thus be created between the axles 12 and 20 in the longitudinal direction of the vehicle, in which space the traction battery 29 and/or other, further components can advantageously be arranged.

Figure 2:
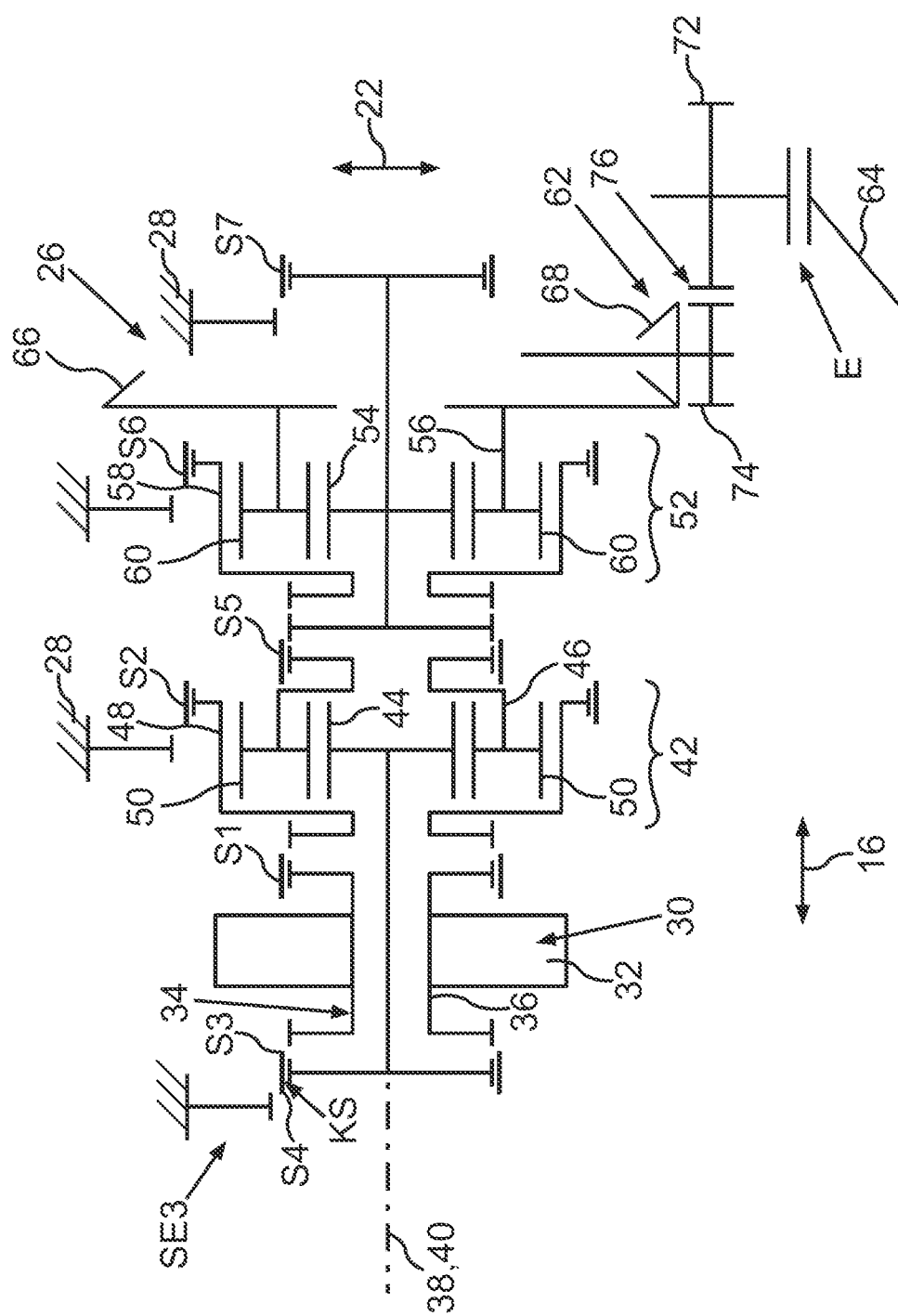
FIG. 2 shows a schematic depiction of a first embodiment of the electric drive.

FIG. 2 shows a first embodiment of the electric drive 26. The electric drive 26 has a housing 28 depicted particularly schematically in FIG. 2 and at least or exactly one electric motor 30 which is also described as a first electric motor. The electric motor 30 has a stator 32 which is also described as a first stator. In addition, the electric motor 30 has a rotor 34 which is also described as a first rotor. The rotor 34 comprises a rotor shaft 36 which is also described as a first rotor shaft. In particular, the rotor 34 can be driven by means of the stator 32, and thus be rotated around a first rotor axis 38 relative to the housing 28 and relative to the stator 32. The first rotor axis 38, which is also simply described as a rotor axis, coincides with a main axis of rotation 40, which is explained in more detail in the following. In particular, the electric motor 30 can provide torques as drive moments via its rotor 34 and in particular via the rotor shaft 36, the vehicle wheels 24, and thus the motor vehicle 10 being able to be driven electrically, in particular purely electrically, by means of the drive moments.

The electric drive 26 has a first planetary gear set 42, which is arranged coaxially with the first rotor axis 38, and thus coaxially with the rotor 34 and with the electric motor 30. The first planetary gear set 42 has a first element, a second element and a third element. In the first embodiment shown in FIG. 2, the first element is a first sun gear 44 that is also described as a first sun. In addition, the second element is a first planetary carrier 46 that is also described as a first stage. The third element is a first annular gear 48. The first planetary gear set 42 additionally comprises first planetary gears 50 that are rotatably mounted on the planetary carrier 46 and respectively interlock or engage, in particular directly, with the annular gear 48 on one side and, in particular directly, with the sun gear 44 on the other side. At least one of the elements of the planetary gear set 42, presently the sun gear 44 and the planetary carrier 46, can be rotated around a first planetary gear set axis of rotation relative to the housing 28 if the at least one element of the planetary gear set 42 is not connected to the housing in a manner fixed against rotation. The first planetary gear set axis of rotation coincides with the main axis of rotation 40 or is the main axis of rotation 40, such that the planetary gear set 42 is arranged coaxially with the electric motor 30.

The electric drive 26 additionally has a second planetary gear set 52, which is arranged coaxially with the first rotor axis 38, and thus coaxially with the rotor 34, with the electric motor 30 and with the first planetary gear set 42. The second planetary gear set 52 has a fourth element, a fifth element and a sixth element. In the first embodiment shown in FIG. 2, the fifth element is a second sun gear 54 that is also described as a second sun. In the first exemplary embodiment, the fifth element has a second planetary carrier 56, which is also described as a second stage. In addition, the sixth element is a second annular gear 58. The second planetary gear set 52 additionally has at least one or several second planetary gears 60 that are rotatably fixed on the second stage and interlock or engage, in particular directly, with the second annular gear 58 on one side and, in particular directly, with the second sun gear 54 on the other side. At least one of the elements of the second planetary gear set 52, presently the sun gear 54 and the planetary carrier 56, can be rotated around a second planetary gear set axis of rotation relative to the housing 28 if the at least one element of the second planetary gear set 52 is not connected to the housing 28 in a manner fixed against rotation. The second planetary gear set axis of rotation coincides with the first planetary gear set axis of rotation, and thus with the first rotor axis 38 and with the main axis of rotation 40, such that the elements of the planetary gear set 52 are arranged coaxially with one another, and the elements of the planetary gears set 42 are arranged coaxially with one another, and the elements of the planetary gear set 52 are arranged coaxially with the elements of the planetary gear set 42, coaxially with the rotor 34, and thus with the rotor shaft 36, and coaxially with the electric motor 30, and thus coaxially with the first rotor axis 38. In other words again, the planetary gear sets 42 and 45 are arranged coaxially with each other, and respectively coaxially with the electric motor 30. The electric motor 30, the first planetary gear set 42 and the second planetary gear set 52 are arranged one after the other in the following order when viewed in the axial direction of the rotor 34, i.e., along the first rotor axis 38 and thus along the main axis of rotation 40: Electric motor 30—the first planetary gear set 42—the second planetary gear set 52.

If the main axis of rotation 40 is mentioned in the following, unless otherwise specified, the first rotor axis 38 and the respective planetary gear set axis of rotation should also be understood to be meant, as the main axis of rotation 40 coincides with the first rotor axis and the planetary gear set axes of rotation.

It can be seen particularly clearly from FIG. 2 that the rotor axis 38 runs at a right angle, i.e., perpendicular, to the longitudinal direction of the vehicle also depicted in FIG. 2 by the double arrow 22, such that the main axis of rotation 40 or the first rotor axis 38 runs at least substantially in parallel with the transverse direction of the vehicle (double arrow 16). A transverse installation of the electric drive 26 is thus provided. In other words, the electric drive 26 is installed transversely or constructed transversely.

So that a particularly compact structure and a particularly efficient drive can be obtained, the first axle 12, the traction battery 29, the second axle 20 and the electric drive 26 are arranged one after the other in the following order in the longitudinal direction of the vehicle: the first axle 12—the traction battery 29—the second axle 20—the electric drive 26. In addition, the housing 28 is rigidly attached to the frame 18, i.e., while bypassing the axles 12 and 20. In other words, the electric drive 26 is not attached to the frame 18 in an axle-fixed manner, i.e., not by means of one of the axles 12 and 20, and thus also not by means of an axle suspension, and instead the housing 28 or the electric drive 26 is fixed to the frame. Naturally, the term "rigid attachment" also comprises a lightly damped attachment, e.g., attachment to the frame 18 via any rubber damping elements. The term "rigid attachment" should emphasize that the axle suspension is effectively not arranged between the housing 28 and the frame 18. The housing 28, along with the frame 18, is thus suspended in relation to the vehicle wheels 14, 24. Thus, for example, if the vehicle wheels 14 and 24 are driven over uneven points on the ground along which the motor vehicle 10 is driven, inward and outward spring movements of the vehicle wheels 14, 24 implemented relative to the frame 18 at least substantially in the vertical direction of the vehicle do not lead to inward and outward spring movements of the housing 28 relative to the frame 18. Thus, the housing 28 is not a non-spring-loaded mass, like the vehicle wheels 14 and 24, for example, and instead is a spring-loaded mass just like the frame 18, such that excessive wear can be avoided.

The electric drive 26 further has an angle drive 62, and the motor vehicle 10 has a cardan shaft 64 depicted particularly schematically in FIGS. 1 and 2, which extends for example from the angle drive 62 in the longitudinal direction of the vehicle, i.e., forwards in parallel with the longitudinal direction of the vehicle, or presently obliquely to the longitudinal direction of the vehicle, and extends up to the driveable axle 20. The angle drive 62 has an input gearwheel 66 and an output gearwheel 68, which interlocks or engages, in particular directly, with the input gearwheel 66. In the first embodiment shown in FIG. 2, the input gearwheel 66 is for example a disc gear, wherein the output gearwheel 68 is for example a bevel gear. One of the elements of the second planetary gear set 52 is or can be coupled with the input gearwheel 66 in a manner fixed against rotation. In the first embodiment, the input gearwheel 66 is coupled, i.e., connected, in particular permanently, with the planetary carrier 56 in a manner fixed against rotation. The input gearwheel 66 can thus be driven by the planetary carrier 56, such that the output gearwheel 68 can be driven by the planetary carrier 56 via the input gearwheel 66.

The output gearwheel 68 is or can be at least indirectly coupled with an input side E of the cardan shaft 64, in particular in a torque-transmitting manner, such that the cardan shaft 64 can be driven by the output gearwheel 68 and thus by the angle drive 62 via its input side E. The cardan shaft 64 can thus be driven by the input gearwheel 66 via the output gearwheel 68, and via the input gearwheel by the planetary carrier 56. The cardan shaft 64 also has an output side A that can be driven by the input side E, the output side A being or being able to be coupled, in particular permanently, with the input side e in a torque-transmitting manner, in particular in a manner fixed against rotation. In particular, it is conceivable that the input side E is coupled, in particular permanently, with the output side A in a torque-transmitting manner. The output side A of the cardan shaft 64 is or can be coupled with an axle gearbox 70, also described as a differential gearbox or designed as a differential gearbox, of the driveable axle 20. In particular, it is conceivable that the output side A is or can be coupled, in particular permanently, with the axle gearbox 70 in a torque-transmitting manner. The axle gearbox 70 can thus be driven by the output side A, and via the output side A by the input side E. It can be seen that the vehicle wheels 24 can be driven electrically, in particular purely electrically, by the cardan shaft 64 via the axle gearbox 70 and via the cardan shaft by the electric drive 26. The feature that the cardan shaft 64 runs in parallel or obliquely with the longitudinal direction of the vehicle should in particular be understood to mean that the axial direction of the cardan shaft 64 runs in parallel or obliquely to the longitudinal direction of the vehicle. Torques provided by the electric drive 26 via the angle drive 62 for driving the vehicle wheels 24 can be guided forwards in the longitudinal direction of the vehicle and to the axle gearbox 70 via the cardan shaft 64, and be transmitted to the vehicle wheels 24 via the axle gearbox 70, whereby the vehicle wheels 24 can be driven.

The respective annular gear 48 or 58 can also be rotated around the main axis of rotation 40 relative to the housing 28 in the first embodiment if it is not connected to the housing 28 in a manner fixed against rotation. In the first embodiment, at least or exactly one spur gear stage 72 is arranged between the input side E of the cardan shaft 64 and the angle drive 62, the spur gear stage having a first gearwheel 74 and a second gearwheel 76. The gearwheels 74 and 76 are preferably spur gears. The gearwheels 74 and 67 interlock directly with each other, i.e., are in direct engagement with each other. The gearwheel 74 is coupled, i.e., connected, in particular permanently, with the output gearwheel 68 in a manner fixed against rotation. The second gearwheel 76 is coupled, i.e., connected, in particular permanently, with the input side E in a manner fixed against rotation, such that the input side E can be driven by the gearwheel 74 via the gearwheel 76, and the gearwheel 76 can be driven by the output gearwheel 68 via the gearwheel 74.

In the second embodiment, the electric drive 26 has a first switch element S1, by means of which the annular gear 48 can be coupled, i.e., can be connected, with the rotor 34 and thus with the rotor shaft 36 in a manner fixed against rotation. Furthermore, the electric drive 26 has a second switch element S2, by means of which the annular gear 48 can be coupled, i.e., connected, with the housing 28 in a manner fixed against rotation. The electric drive 26 also has a third switch element S3, by means of which the sun gear 44 can be coupled with the rotor 34 in a manner fixed against rotation. The electric drive 26 additionally comprises a fourth switch element S4, by means of which the sun gear 44 can be coupled with the housing 28 in a manner fixed against rotation. The fourth switch element S4 and presently also the third switch element S3 are arranged on a side SE3 of the electric motor 30 facing away from the first planetary gear set 42 in the axial direction of the rotor 34. The electric drive 26 additionally comprises a fifth switch element S5, by means of which the planetary carrier 46 can be coupled with the second sun gear 54 in a manner fixed against rotation. In the second embodiment, the second planetary carrier 56 is or can be coupled, in particular permanently, with the input gearwheel 66 of the angle drive 62 in a manner fixed against rotation.

The fifth switch element S5 is designed to couple the planetary carrier 46, in particular simultaneously, with the second sun gear 54 in a manner fixed against rotation and with the second annular gear 58 in a manner fixed against rotation. In particular, the fifth switch element S5 can be switched between three switch states, which can also be described as coupling states. In a first of the switch states, the second element, i.e., the first planetary carrier 46, is connected to the fourth element, i.e., to the second sun gear 54 in a manner fixed against rotation by means of the fifth switch element S5, in particular while the fifth switch element S5 releases the sixth element and thus the second annular gear 58 for a rotation implemented around the main axis of rotation 40 relative to the second element and the fourth element. In a second of the switch states, the second element, and thus the planetary carrier 46, is coupled, i.e., connected with the sixth element and thus to the second annular gear 58 in a manner fixed against rotation by means of the fifth switch element S5, while the fifth switch element S5 releases the fourth element and thus the second sun gear 54 for a rotation implemented around the main axis of rotation 40 relative to the second element and the sixth element. In a third of the switch states, the second element, and thus the first planetary carrier 46, is simultaneously coupled or connected with the fourth element, and thus with the second sun gear 54, in a manner fixed against rotation, and with the sixth element, and thus with the annular gear 58, in a manner fixed against rotation, such that in the third switch state, the second element, the fourth element and the sixth element are connected to one another in a manner fixed against rotation by means of the fifth switch element S5. The first switch state and the second switch state can also be seen as decoupled states, since in the first switch state, the sixth element can rotate around the main axis of rotation 40 relative to the second element, relative to the fourth element and relative to the sixth element, and since in the second switch state, the fourth element can rotate around the main axis of rotation 40 relative to the second element and relative to the sixth element.

The electric drive 26 additionally comprises a sixth switch element S6 by means of which the sixth element and thus the second annular gear 58 can be coupled, i.e., connected, with the housing 28 in a manner fixed against rotation.

In the second embodiment, the switch elements S3 and S4 are arranged axially next to each other. This means that the switch elements S3 and S4 are arranged next to each other in the axial direction of the rotor 34, wherein the switch elements S3 and S4 are combined to form a coupler switch element KS. For example, the switch elements S3 and S4 are designed as one part with each other. For example, the switch element S3 is a first part or a first region of the coupler switch element KS, and the switch element S4 is a second part or a second region of the coupler switch element KS. For example, the coupler switch element KS can be switched between a fourth switch state and a fifth switch state. In the fourth switch state, the first element, and thus the first sun gear 44, is for example connected to the housing 28 in a manner fixed against rotation by means of the coupler switch element KS, in particular by means of the fourth switch element S4, and the coupler switch element KS, in particular the switch elements S3 and S4, preferably permits a rotation of the rotor 34 around the main axis of rotation 40 relative to the first element 44. In the fifth switch element, the first element, and thus the first sun gear 44, is for example coupled with the rotor 34 in a manner fixed against rotation by means of the coupler switch element KS, in particular by means of the third switch element S3, and for example, the coupler switch element KS, in particular the switch elements S3 and S4, permits an in particular shared rotation of the rotor 34 and of the sun gear 44 implemented around the main axis of rotation 40 relative to the housing 28. It is conceivable that the coupler switch element KS or the switch elements S3 and S4 can be switched into a sixth switch state that is described as a neutral state. In the sixth switch state, for example, the coupler switch element KS, in particular the switch elements S3 and S4, permits a rotation of the first element (sun gear 44) implemented around the main axis of rotation 40 relative to the housing 28 and relative to the motor 34 or vice versa.

The electric drive 26 additionally has a seventh switch element S7, by means of which the fourth element, i.e., the second sun gear 54, can be connected with the housing 28 in a manner fixed against rotation. For example, the fourth switch element S4, the electric motor 30, the first planetary gear set 42, the second planetary gear set 52, the input gearwheel 66 and the seventh switch element S7 are arranged one after the other, i.e., following one another in the following order when viewed in the direction of the main axis of rotation 40 and/or when viewed in the axial direction of the electric motor 30 and thus along the main axis of rotation 40: The fourth switch element S4—the electric motor 30—the first planetary gear set 42—the second planetary gear set 52—the input gearwheel 66—the seventh switch element S7.

By means of the planetary gear sets 42 and 52 that are connected to each other and by means of the switch elements S1-S7, at least or exactly six gears of the electric drive 26 can be obtained. To engage a first of the gears, the rotor 34 is connected with the sun gear 44 in a manner fixed against rotation by means of the coupler switch element KS, in particular by means of the third switch element S3, a connection in a manner fixed against rotation of the rotor 34 with the planetary carrier 46 ceases, and thus the rotor 34 is not connected to the planetary carrier 46 in a manner fixed against rotation by means of the switch element S1, the annular gear 48 is connected to the housing 28 in a manner fixed against rotation by means of the switch element S2, the planetary carrier 46 is connected with the sun gear 54 in a manner fixed against rotation by means of the switch element S5, in particular while the switch element S5 releases the annular gear 58 for a rotation implemented around the main axis of rotation 40 relative to the planetary carrier 46 and the sun gear 54 or vice versa, the planetary carrier 56 is connected to the housing 28 in a manner fixed against rotation by means of the switch element S6, and a connection of the sun gear 54 with the housing 28 in a manner fixed against rotation ceases by means of the switch element S7, i.e., the sun gear 54 is not connected with the housing 28 in a manner fixed against rotation by means of the switch element S7.

It can be seen that the previous descriptions of for example the respective switch element releasing a component element for a rotation implemented around the main axis of rotation 40 relative to another component element can of course also be considered or apply vice versa, such that it should also be understood to mean that the respective switch element releases the other component element for a rotation implemented around the main axis of rotation 40 relative to the one component element.

To engage a second of the gears, the sun gear 44 is connected to the housing 28 in a manner fixed against rotation by means of the coupler switch element KS, in particular by means of the fourth switch element S4, in particular while the coupler switch element KS releases a rotation of the rotor 34 implemented around the main axis of rotation 40 relative to the sun gear 44, the rotor 34 is connected to the annular gear 48 in a manner fixed against rotation by means of the switch element S1, the annular gear 48 is not connected to the housing 28 in a manner fixed against rotation by means of the switch element S2, the planetary carrier 46 is connected to the sun gear 54 in a manner fixed against rotation by means of the switch element S5 like when the first gear is engaged, while the switch element S5 releases the annular gear 58 for a rotation implemented around the main axis of rotation 40 relative to the sun gear 44 and relative to the planetary carrier 46 or vice versa, the annular gear 58 is connected to the housing 28 in a manner fixed against rotation by means of the switch element S6 like when the first gear is engaged, the sun gear 54 is not connected to the housing 28 in a manner fixed against rotation by means of the seventh switch element S7, like when the first gear is engaged, such that the switch element S7 releases the sun gear 54 for a rotation implemented around the main axis of rotation 40 relative to the housing 28. To engage a third of the gears, the rotor 34 is connected to the sun gear 44 in a manner fixed against rotation by means of the coupler switch element KS, in particular by means of the third switch element S3, like when the first gear is engaged, the rotor 34 is connected to the annular gear 48 in a manner fixed against rotation by means of the switch element S1 like when the second gear is engaged, the annular gear 48 is not connected to the housing 28 by means of the switch element S2 like when the second gear is engaged, such that the switch element S2 releases the annular gear 48 for a rotation implemented around the main axis of rotation 40 relative to the housing 28, the planetary carrier 46 is connected to the sun gear 54 in a manner fixed against rotation by means of the switch element S5 like when the first gear and the second gear are engaged, wherein the switch element S5 releases the planetary carrier 46 and the sun gear 54 for a rotation implemented around the main axis of rotation 40 relative to the annular gear 58 or vice versa, the annular gear 58 is connected to the housing 28 in a manner fixed against rotation by means of the switch element S6 like when the first gear and the second gear are engaged, and the sun gear 54 is not connected to the housing 28 in a manner fixed against rotation by means of the switch element S7 like when the first and the second gear are engaged, such that the switch element S7 releases the sun gear 54 for a rotation implemented around the main axis of rotation 40 relative to the housing 28. To engage a fourth of the gears, the sun gear 44 is connected to the housing 28 in a manner fixed against rotation by means of the coupler switch element KS, in particular by means of the fourth switch element S4, like when the second gear is engaged, the rotor 34 is connected to the annular gear 48 in a manner fixed against rotation by means of the switch element S1 like when the second and third gear are engaged, the annular gear 48 is not connected to the housing 28 in a manner fixed against rotation by means of the switch element S2 like when the second and third gear are engaged, such that the switch element S2 releases the annular gear 48 for a rotation implemented around the main axis of rotation 40 relative to the housing 28, the planetary carrier 46 is connected to the annular gear 58 in a manner fixed against rotation by means of the switch element S5, while the switch element S5 releases the planetary carrier 46 and the annular gear 58 for a rotation implemented around the main axis of rotation 40 relative to the sun gear 54 or vice versa, the annular gear 58 is not connected to the housing 28 in a manner fixed against rotation by means of the switch element S6, such that the switch element S6 releases the annular gear 58, and thus the planetary carrier 46, for a rotation implemented around the main axis of rotation 40 relative to the housing 28, and the sun gear 54 is connected to the housing 28 in a manner fixed against rotation by means of the seventh switch element S7. To engage a fifth of the gears, the rotor 34 is connected to the sun gear 44 in a manner fixed against rotation by means of the coupler switch element KS, in particular by means of the third switch element S3, like when the first and third gears are engaged, and the rotor 34 is connected to the annular gear 48 in a manner fixed against rotation by means of the switch element S1 like when the second and third gears are engaged, the annular gear 48 is not connected to the housing 28 in a manner fixed against rotation by means of the switch element S2, such that the switch element S2 releases the annular gear 48, and thus the rotor 34 and the sun gear 44, for a rotation implemented around the main axis of rotation 40 relative to the housing 28, the planetary carrier 46 is connected to the annular gear 58 in a manner fixed against rotation by means of the switch element S5 like when the fourth gear is engaged, while the switch element S5 releases the annular gear 58 and the planetary carrier 46 for a rotation implemented around the main axis of rotation 40 relative to the sun gear 44 or vice versa, the annular gear 58 is not connected to the housing 28 in a manner fixed against rotation by means of the switch element S6 like when the fourth gear is engaged, such that the switch element S6 releases the annular gear 48 and thus the planetary carrier 46 for a rotation around the main axis of rotation 40 relative to the housing 28, and the sun gear 54 is connected to the housing 28 in a manner fixed against rotation by means of the seventh switch element S7 like when the fourth gear is engaged. To engage the sixth gear, the rotor 34 is connected to the sun gear 44 in a manner fixed against rotation by means of the coupler switch element KS, in particular by means of the third switch element S3, like when the first, third and fifth gears are engaged, the rotor 34 is connected to the annular gear 48 in a manner fixed against rotation by means of the switch element S1 like when the second, third, fourth and fifth gears are engaged, the annular gear 48 is not connected to the housing 28 in a manner fixed against rotation by means of the switch element S2, such that the switch element S2 releases the annular gear 48 and thus the rotor 34 and the sun gear 44 for a rotation implemented around the main axis of rotation 40 relative to the housing 28, the planetary carrier 46 is simultaneously connected to the sun gear 54 in a manner fixed against rotation and to the annular gear 58 in a manner fixed against rotation by means of the switch element S5, such that the planetary carrier 46, the sun gear 54 and the annular gear 58 are simultaneously connected to each other in a manner fixed against rotation by means of the fifth switch element S5, the annular gear 58 is connected to the housing 28 in a manner fixed against rotation by means of the switch element S6 or the annular gear 58 is not connected to the housing 28 in a manner fixed against rotation by means of the switch element S6, such that for example the switch element S6 releases the annular gear 58, and thus the sun gear 54 and the planetary carrier 46, for a rotation implemented around the main axis of rotation 40 relative to the housing 28, and the sun gear 54 is not connected to the housing 28 in a manner fixed against rotation by means of the seventh switch element S7, such that for example the switch element S7 releases the sun gear 54, and thus preferably also the planetary carrier 46 and the annular gear 58, for a rotation implemented around the main axis of rotation 40 relative to the housing 28.

The first embodiment of the electric drive 26 is suitable, for example, for particularly light, i.e., low-weight to midweight vehicles.

Figure 3:
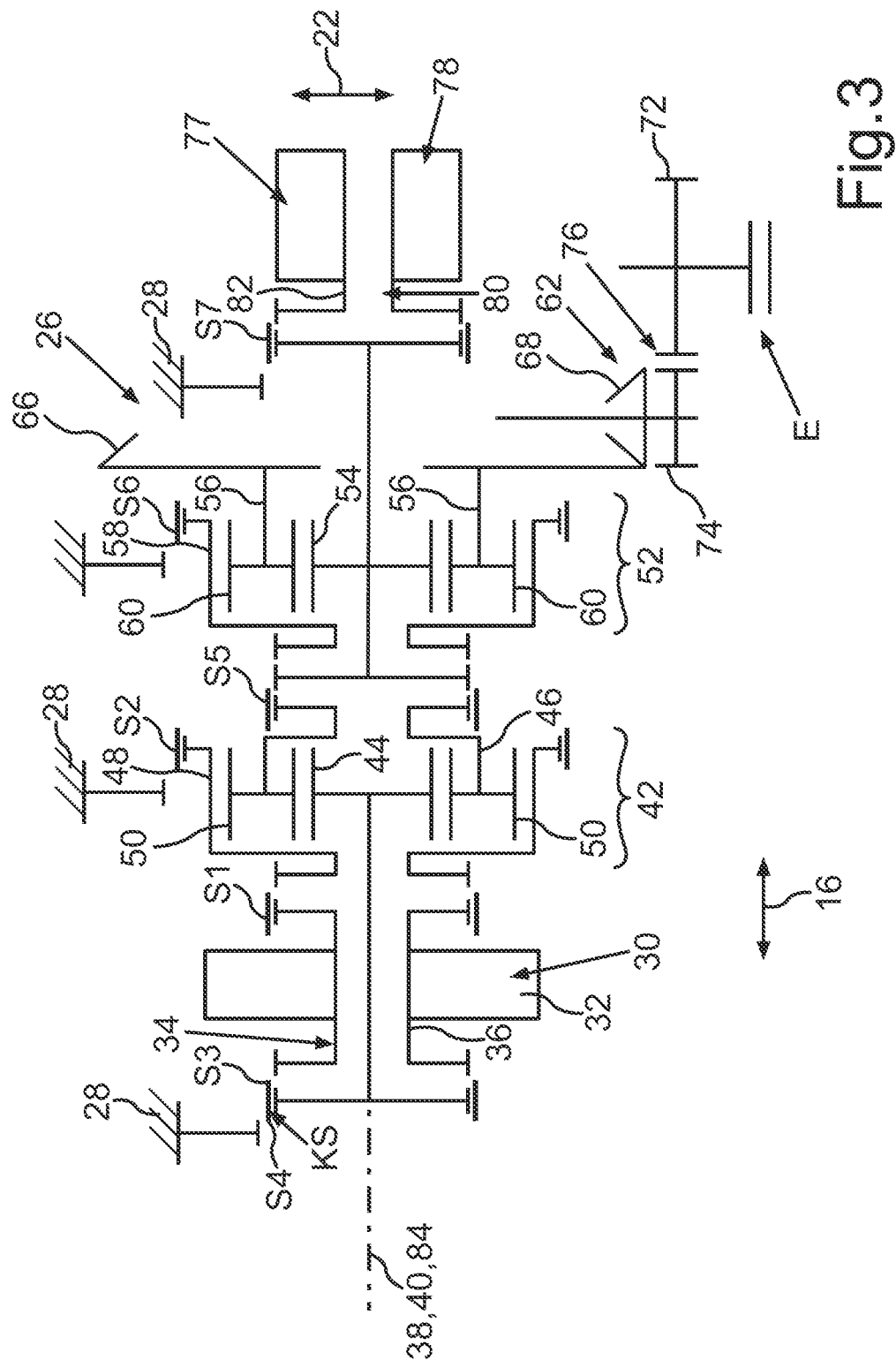
FIG. 3 shows a schematic depiction of a second embodiment of the electric drive.

FIG. 3 shows a second embodiment of the electric drive 26. The second embodiment is particularly advantageously suitable for heavy long-distance vehicles. In the second embodiment, the electric drive 26 comprises a second electric motor 77 arranged coaxially with the electric motor 30, the second electric motor having a second stator 78 and a second rotor 80, in particular having a second rotor shaft 82. It is in particular conceivable that the respective stator 32 or 78 is fixed to the housing 28, in particular in a manner fixed against rotation. The rotor 80 can be rotated around a second rotor axis 84 relative to the second stator 78. As the electric motors 30 and 77 are arranged coaxially with each other, the second rotor axis 84 coincides with the first rotor axis 38 and thus with the main axis of rotation 40, such that the electric motor 77 or its rotor 80 are also arranged coaxially with the planetary gear sets 42 and 52, and thus coaxially with their elements. The second electric motor 77 can provide second torques as second drive moments via the rotor 80, the vehicle wheels 24 being able to be driven electrically, in particular purely electrically, by means of the drive moments. The second rotor 80 is or can be coupled with one of the elements of the second planetary gear set 52 in a manner fixed against rotation. For example, a further switch element can be provided, by means of which the rotor 80 can be coupled with the one element of the planetary gear set 52 in a manner fixed against rotation. In the second embodiment, which is shown in FIG. 3, the second switch element is formed by the switch element S7 or designed as one part with the switch element S7. In other words, in the second embodiment shown in FIG. 3, the switch element S7 is used to connect the rotor 80 to the one element of the second planetary gear set 52 optionally or as required in a manner fixed against rotation. In the second embodiment shown in FIG. 3, the one element of the second planetary gear set 52 is the second sun gear 54, such that it is provided in the second embodiment that the rotor 80 can be connected to the sun gear 54 in a manner fixed against rotation, in particular by means of the further switch element or by means of the seventh switch element S7. For example, the switch element S7 can be switched between three states. In a first of the states, the switch element S7 releases both the sun gear 54 and the rotor 80 for a rotation implemented around the main axis of rotation 40 relative to the housing 28 and relative to each other, such that for example the rotor 80 is connected neither to the sun gear 54 nor to the housing 28 in a manner fixed against rotation in the first state. In a second of the states, the sun gear 54 can for example be connected to the housing 28 in a manner fixed against rotation by means of the switch element S7, while for example the switch element S7 releases the rotor 80 for a rotation implemented around the main axis of rotation 40 relative to the housing 28 and relative to the housing 28. In a third of the states, the rotor 80 can for example be connected to the sun gear 54 in a manner fixed against rotation by means of the switch element S7, while the switch element S7 releases the rotor 80 and the sun gear 54 for a rotation implemented around the main axis of rotation 40 relative to the housing 28. It is thus provided in the second embodiment that the rotor 80 is or can be coupled with the fourth element in a manner fixed against rotation.

In the second embodiment, the first electric motor 30, the first planetary gear set 42, the second planetary gear set 52, the input gearwheel 66 and the second electric motor 77 are arranged one after the other, i.e., following one another in the following order when viewed in the direction of the driveable second axle 20 (main drive axle) and/or when viewed in the axial direction of the rotor 34, of which the axial direction coincides with the axial direction of the rotor 80: the first electric motor 30—the first planetary gear set 42—the second planetary gear set 52—the input gearwheel 66—the second electric motor 77.

In particular, it is provided in the second embodiment that the planetary gear sets 42 and 52 are arranged between the electric motors 30 and 77 in the axial direction of the respective electric motor 30 or 77, such that the electric motor 77 is arranged on a side of the planetary gear set 52 facing away from the electric motor 30 in the axial direction of the respective electric motor 30 or 77, and the electric motor 30.

A further embodiment of the electric drive 26 not shown in the FIG. is suitable for example for heavy construction vehicles. In this further embodiment not shown in the FIG., the electric motors 30 and 77 are for example arranged on a shared side of the first planetary gear set 42 facing away from the second planetary gear set 52 and facing the electric motors 30 and 77 in the axial direction of the respective electric motor 30 or 77. A coupling element is for example conceivable, by means of which the rotors 34 and 80 can be connected to each other in a manner fixed against rotation. It is also conceivable, for example, that the rotor 80 can be connected to the annular gear 48 in a manner fixed against rotation by means of the switch element S1, wherein for example the second electric motor 77 is arranged between the electric motor 30 and the first planetary gear set 42 in the axial direction of the respective electric motor 30 or 77. For example, the coupling element is arranged between the electric motors 30 and 77 in the axial direction of the respective electric motor 30 or 77.

Figure 4:
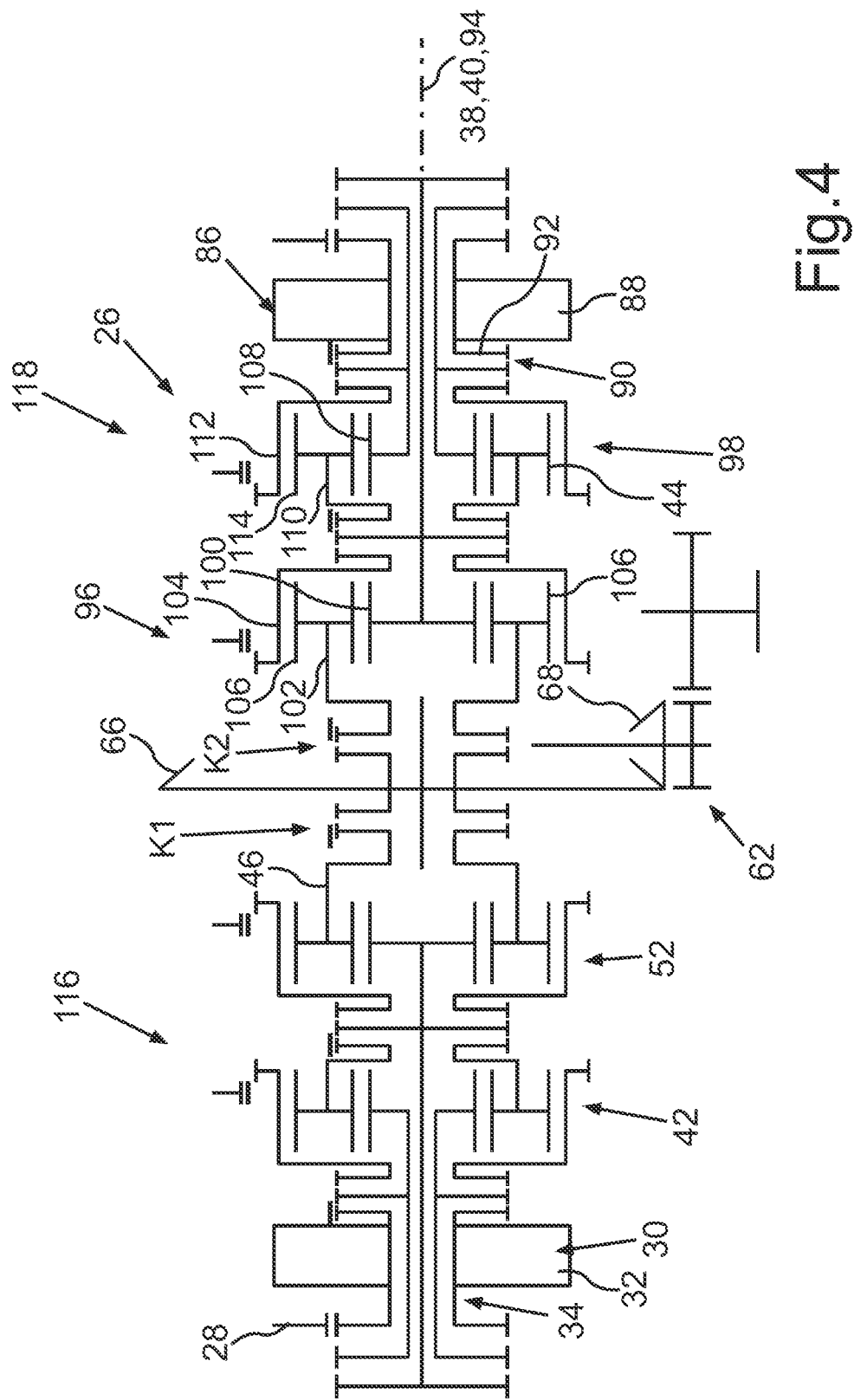
FIG. 4 shows a schematic depiction of a third embodiment of the electric drive.

Finally, FIG. 4 shows a third embodiment of the electric drive 26. In the third embodiment, a further electric motor 86 is provided with a further stator 88 and a further rotor 90 which has, for example a further rotor shaft 92. In particular, the further rotor 90 can be rotated around a further rotor axis 94 relative to the further stator 88. The electric motors 86 and 30 are arranged coaxially with each other, such that the rotor axis 94 coincides with the main axis of rotation 40. The rotors 34 and 90 are thus arranged coaxially with each other, and the electric motor 86 or its rotor 90 is arranged coaxially with the planetary gear sets 42 and 52.

In the third embodiment, a third planetary gear set 96 having a seventh element, eighth element and ninth element is provided, and a fourth planetary gear set 98 is provided with a tenth element, eleventh element and twelfth element. In the third embodiment, the seventh element is a third sun gear 100, the eighth element is a third planetary carrier 102, which is also described as a third stage, and the ninth element is a third annular gear 104. The third planetary gear set 96 has at least one or several third planetary gears 106 that are rotatably fixed to the planetary carrier 102 and interlock, in particular directly, with the annular gear 104 on one side and with the sun gear 100, which is also described as a third sun, in particular directly on the other side. Consequently, the third planetary carrier 102 is also described as a third stage. The tenth element is a fourth sun gear 108, which is also described as a fourth sun, the eleventh element is a fourth planetary carrier 110, which is also described as a fourth stage, and the twelfth element is an annular gear 112. The fourth planetary gear set 98 has at least one or several fourth planetary gears 114 that are rotatably fixed on the fourth stage and interlock or engage, in particular directly, with the fourth annular gear 112 on one side and, in particular directly, with the fourth sun on the other side. It can be seen that the planetary gear sets 96 and 98 are arranged coaxially with each other, wherein the planetary gear set 96 and the planetary gear set 98 are arranged coaxially with the electric motors 30 and 86 or coaxially with their rotors 34 and 90. The second rotor 90 is or can be coupled with the seventh element in a manner fixed against rotation, wherein the eighth element is or can be coupled with the tenth element, and wherein the eleventh element is or can be coupled with the input gearwheel 66 of the angle drive 62 in a manner fixed against rotation. In principle, the third embodiment is the first embodiment in duplicate, such that, for example, the third embodiment can thus be generated from the first embodiment by mirroring the first embodiment or the components arranged to the left of the input gearwheel 66 in relation to the image plane of FIG. 2 on a mirror plane in order thus to create the components arranged on the right next to the input gearwheel 66 in relation to the image plane of FIG. 4, wherein the mirror plane runs perpendicular to the main axis of rotation 40, and wherein the input gearwheel 66, for example designed as a disc gear, of the angle drive 62, for example also designed as a bevel drive, runs in the mirror plane. A first gearbox 116 comprising the planetary gear sets 42 and 52 and for example the electric motor 30 is thus provided, and a second gearbox 118 comprising the planetary gear sets 96 and 98 and for example the electric motor 86 is provided, which is or can be a mirror image of the gearbox 116 in relation to the mirror plane. It is conceivable that the transmission row of the left gearbox 116 differs from that of the right gearbox 118. It is further conceivable that the electric motors 30 and 86 differ from each other in their sizes and/or power, such that for example the electric motor 30 is larger than the electric motor 86 or vice versa. The fourth embodiment has the following advantages in particular:

- switching without interruption in the traction force, the gearbox switch points are different on the left and on the right due to the transmission row,
- due to the different transmission rows, different electric motors 30 and 86 are also possible. A large electric motor is particularly advantageously installed on one side, the electric motor having a high power and being able to be used while managing driving processes and to drive on inclines. On the other side, a small electric motor, for example having a power of 80 to 120 kilowatts, is advantageously used for more efficient driving over a long distance. The goal is that as soon as the motor vehicle 10 is on the motorway, it requires a power of 100 kilowatts, and the motor vehicle 10 receives this power from the smaller electric motor. Two different electric motors having the features specified here are also advantageously used in the second embodiment.

The angle drive 62 can be decoupled, in particular via a coupling K1 or K2. It can be seen that one of the elements of the planetary gear set 52, in particular of the planetary carrier 46, can be connected to the input gearwheel 66 in a manner fixed against rotation by means of the coupling K1, and the input gearwheel 66 can be coupled with one of the elements of the planetary gear set 96, in particular with the planetary carrier 102, in a manner fixed against rotation by means of the coupling K2. The respective coupling K1 or K2 can be a form-fit coupling, in particular a claw coupling. The corresponding other torque path or the other electric motor is only switched on when required or in the event of an incline or recuperation (braking). A particularly large range can thus be represented when the battery capacity remains the same.

In particular with regard to the first embodiment, and optionally the second embodiment, and the further embodiment not shown in the FIG., it should be noted that at least almost all the transmission variants are possible via other planetary gear sets, angle drive and spur gear transmission ratios. This unit represents a high-voltage power unit, comparable with a power pack in conventional drives. Using the cardan shaft 64, the electric drive 26 can be flange-mounted on current axle and frame constructions without alterations to the latter, for example in order to provide an electric or hybrid vehicle from a conventional vehicle that exclusively has an internal combustion engine. While different electric axles are required today for light and heavy utility vehicles or buses, current vehicle-specific axles can be maintained by using the electric drive 26, and the same electric drive 26 can be installed as a high-voltage power unit, in particular with adjustment of the bevel/spur gear transmission ratio. The electric drive 26 is small, more manageable with regard to production, storage and logistics in comparison with an electric axle, and fixed to the frame. This is particularly good for electrical components, as excessive vibrations of these components can be avoided. The electric drive 26 also offers the possibility of providing vehicles as P3 or P4 hybrids. From a cost perspective, the number of switch elements can be kept particularly low, or the number of switch elements can be reduced in relation to the number shown, whereby costs and weight can be saved, wherein a lower number of gears can also be provided.

| List of reference characters: | |
| --- | --- |
| 10 | motor vehicle |
| 12 | first axle |
| 14 | first vehicle wheel |
| 16 | double arrow |
| 18 | frame |
| 20 | second axle |
| 22 | double arrow |
| 24 | second vehicle wheel |
| 26 | electric drive |
| 27 | arrow |
| 28 | housing |
| 29 | traction battery |
| 30 | electric motor |
| 32 | stator |
| 34 | rotor |
| 36 | rotor shaft |
| 38 | rotor axis |
| 40 | main axis of rotation |
| 42 | first planetary gear set |
| 44 | sun gear |
| 46 | planetary carrier |
| 48 | annular gear |
| 50 | planetary gear |
| 52 | second planetary gear set |
| 54 | sun gear |
| 56 | planetary carrier |
| 58 | annular gear |
| 60 | planetary gear |
| 62 | angle drive |
| 64 | cardan shaft |
| 66 | input gearwheel |
| 68 | output gearwheel |
| 70 | axle gearbox |
| 72 | spur gear stage |
| 74 | first gearwheel |

-continued

List of reference characters:

| | |
|---|---|
| 76 | second gearwheel |
| 77 | second electric motor |
| 78 | second stator |
| 80 | second rotor |
| 82 | second rotor shaft |
| 84 | second rotor axis |
| 86 | further electric motor |
| 88 | further stator |
| 90 | further rotor |
| 92 | further rotor shaft |
| 94 | further rotor axis |
| 96 | third planetary gear set |
| 98 | fourth planetary gear set |
| 100 | sun gear |
| 102 | planetary carrier |
| 104 | annular gear |
| 106 | planetary gear |
| 108 | sun gear |
| 110 | planetary carrier |
| 112 | annular gear |
| 114 | planetary gear |
| 116 | first gearbox |
| 118 | second gearbox |
| A | output side |
| E | input side |
| K1, K2 | coupling |
| KS | coupler switch element |
| S1-S7 | switch element |
| SE1-3 | side |

The invention claimed is:

1. A motor vehicle (10), comprising:
a steerable first axle (12);
a drivable second axle (20);
an electric drive (26) for driving the second axle (20); and
a traction battery (28), wherein the electric drive (26) is providable with electrical energy stored in the traction battery (28) via the traction battery (28);
wherein the electric drive (26) has:
a housing (28);
an electric motor (30) which has a stator (32) and a rotor (34) that is rotatable around a rotor axis (38) relative to the stator (32) and relative to the housing (28);
a first planetary gear set (42) arranged coaxially with the rotor axis (38), wherein the first planetary gear set (42) has a first element, a second element, and a third element; and
a second planetary gear set (52) arranged coaxially with the rotor axis (38), wherein the second planetary gear set (52) has a fourth element, a fifth element, and a sixth element, wherein in an axial direction of the rotor (34), the electric motor (30), the first planetary gear set (42) and the second planetary gear set (52) are arranged one after the other in the following order: the electric motor (30), the first planetary gear set (42), and the second planetary gear set (52), and wherein the rotor axis (38) is arranged at a right angle to a longitudinal direction (22) of the motor vehicle (10);
wherein:
in the longitudinal direction (22) of the motor vehicle (20), the first axle (12), the traction battery (28), the second axle (20), and the electric drive (26) are arranged one after the other in the following order: the first axle (12), the traction battery (28), the second axle (20), and the electric drive (26);
the housing (28) is rigidly attached to a frame (18) of the motor vehicle (10);
the electric drive (26) has an angle drive (62);
the motor vehicle (10) has a cardan shaft (64);
one of the fourth, fifth, and sixth elements of the second planetary gear set (52) is couplable with an input gearwheel (66) of the angle drive (62) in a manner fixed against rotation;
an output gearwheel (68) of the angle drive (62) is couplable with an input side (E) of the cardan shaft (64); and
an output side (A) of the cardan shaft (64) is couplable with an axle gearbox (70) of the second axle (20).

2. The motor vehicle (10) according to claim 1, wherein the output gearwheel (68) of the angle drive (62) is coupled with a first gearwheel (74) of a spur gear stage (72) in a manner fixed against rotation.

3. The motor vehicle (10) according to claim 2, wherein a second gearwheel (76) of the spur gear stage (72) is coupled with the input side (E) of the cardan shaft (64) in a manner fixed against rotation.

4. The motor vehicle (10) according to claim 1, wherein the electric drive (26) further has:
a first switch element (S1) via which the third element is couplable with the rotor (34) in a manner fixed against rotation;
a second switch element (S2) via which the third element is couplable with the housing (28) in a manner fixed against rotation;
a third switch element (S3) via which the first element is couplable with the rotor (34) in a manner fixed against rotation;
a fourth switch element (S4) via which the first element is couplable with the housing (28) in a manner fixed against rotation, wherein the fourth switch element (S4) is arranged on a side (S3) of the electric motor (30) facing away from the first planetary gear set (42) in the axial direction of the rotor (34); and
a fifth switch element (S5) via which the second element is couplable with the fourth element in a manner fixed against rotation, wherein the fifth element is couplable with the input gearwheel (66) of the angle drive (62) in a manner fixed against rotation.

5. The motor vehicle (10) according to claim 4, wherein the fifth switch element (S5) is configured to couple the second element with the fourth element in a manner fixed against rotation and with the sixth element in a manner fixed against rotation.

6. The motor vehicle (10) according to claim 4, wherein the sixth element is couplable with the housing (28) via a sixth switch element (S6) in a manner fixed against rotation.

7. The motor vehicle (10) according to claim 6, wherein the fourth element is couplable with the housing (28) via a seventh switch element (S7) in a manner fixed against rotation.

8. The motor vehicle (10) according to claim 7, wherein the fourth switch element (S4), the electric motor (30), the first planetary gear set (42), the second planetary gear set (52), the input gearwheel (66), and the seventh switch element (S7) are arranged one after the other in the following order when viewed in a direction of the driveable second axle (20) and/or in the axial direction of the rotor (34): the fourth switch element (S4), the electric motor (30), the first planetary gear set (42), the second planetary gear set (52), the input gearwheel (66), and the seventh switch element (S7).

9. The motor vehicle (10) according to claim 4, wherein the third switch element (S3) and the fourth switch element (S4) are arranged axially neighboring each other and are combined to form a coupler switch element (KS) having at least two switch positions.

10. The motor vehicle (10) according to claim 1, further comprising a second electric motor (77) which is arranged coaxially with the electric motor (30) and which has a second stator (78) and a second rotor (80) that is rotatable relative to the second stator (78), wherein the second rotor (80) is couplable with one of the fourth, fifth, and sixth elements of the second planetary gear set (52) in a manner fixed against rotation.

11. The motor vehicle (10) according to claim 10, wherein the second rotor (80) is couplable with the fourth element in a manner fixed against rotation.

12. The motor vehicle (10) according to claim 10, wherein the first electric motor (30), the first planetary gear set (42), the second planetary gear set (52), the input gearwheel (66), and the second electric motor (77) are arranged one after the other in the following order when viewed in a direction of the driveable second axle (20) and/or in an axial direction of the first electric motor (30): the first electric motor (30), the first planetary gear set (42), the second planetary gear set (52), the input gearwheel (66), and the second electric motor (77).

13. The motor vehicle (10) according to claim 1, further comprising:
 a further electric motor (86) having a further stator (88) and a further rotor (90), which is arranged coaxially with the rotor (34), the first planetary gear set (42), and the second planetary gear set (52);
 a third planetary gear set (96) having a seventh element, an eighth element, and a ninth element which are arranged coaxially with the rotor (34), the further rotor (90), the first planetary gear set (42), and the second planetary gear set (52); and
 a fourth planetary gear set (98) having a tenth element, an eleventh element, and a twelfth element which are arranged coaxially with the rotor (34), the further rotor (90), the first planetary gear set (42), the second planetary gear set (52), and the third planetary gear set (96), wherein the further rotor (90) is couplable with the seventh element in a manner fixed against rotation, wherein the eighth element is couplable with the tenth element, and wherein the eleventh element is couplable with the input gearwheel (66) of the angle drive (62) in a manner fixed against rotation.

14. The motor vehicle (10) according to claim 13, wherein the electric motor (30), the first planetary gear set (42), the second planetary gear set (52), the input gearwheel (66) of the angle drive (62), the fourth planetary gear set (98), the third planetary gear set (96), and the further electric motor (86) are arranged one after the other in the following order when viewed in a direction of the driveable second axle (20) and/or in the axial direction of the first rotor (34): the first electric motor (30), the first planetary gear set (42), the second planetary gear set (52), the input gearwheel (66) of the angle drive (62), the fourth planetary gear set (98), the third planetary gear set (96), and the further electric motor (86).

* * * * *